(12) United States Patent
Schütz

(10) Patent No.: US 8,821,043 B2
(45) Date of Patent: Sep. 2, 2014

(54) DEVICE FOR A MOTOR VEHICLE COMPRISING A MOVABLY MOUNTED CAMERA UNIT AND MOTOR VEHICLE

(75) Inventor: Heiko Schütz, Velbert (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 0 days.

(21) Appl. No.: 13/522,340

(22) PCT Filed: Jan. 13, 2011

(86) PCT No.: PCT/EP2011/050403
§ 371 (c)(1),
(2), (4) Date: Jul. 31, 2012

(87) PCT Pub. No.: WO2011/086131
PCT Pub. Date: Jul. 21, 2011

(65) Prior Publication Data
US 2012/0315027 A1    Dec. 13, 2012

(30) Foreign Application Priority Data
Jan. 21, 2010  (DE) .......................... 10 2010 001 108

(51) Int. Cl.
*G03B 17/00*        (2006.01)
(52) U.S. Cl.
USPC ........................................................ 396/419
(58) Field of Classification Search
USPC ..................... 396/12, 427, 433, 419; 348/148
See application file for complete search history.

(56) References Cited

U.S. PATENT DOCUMENTS 6,524,020 B2 *    2/2003   Ellinger et al. ................ 396/419
2002/0005897 A1 *  1/2002   Kim ............................... 348/148

(Continued)

FOREIGN PATENT DOCUMENTS

| CN | 101506456 A | 8/2009 |
| DE | 10204764 A1 | 8/2003 |

(Continued)

OTHER PUBLICATIONS

International Search Report; International Application No. PCT/EP2011/050403; International Application Filing Date Jan. 13, 2011; Mail date Apr. 19, 2011.

(Continued)

*Primary Examiner* — Rodney Fuller
(74) *Attorney, Agent, or Firm* — Cantor Colburn LLP

(57) ABSTRACT

The invention relates to a device (1) for a motor vehicle, comprising a movably mounted camera unit (10), which can be brought into an idle position (A) and an active position (B) by means of a drive unit (11), and to a protection element (12), which can be transferred into a closed position and an open position, wherein the camera unit (10) is located in the idle position thereof inaccessible from the outside behind the protection element (12) when the protection element (12) is in the closed position and the camera unit (10) is located in the active position for image acquisition when the protection element (12) is in the open position wherein the camera unit (10) is arranged on a movably mounted pivot arm (3), which connects the drive unit (11) to the protection element (12), wherein a movement of the pivot arm (3) triggered by the drive unit (11) can transfer the protection element (12) into the closed position and open position and the camera unit (10) into the idle position and the active position. The invention further relates to a vehicle, in particular a motor vehicle, comprising such a device.

18 Claims, 3 Drawing Sheets

(56) References Cited

U.S. PATENT DOCUMENTS

| | | |
|---|---|---|
| 2003/0146831 A1 | 8/2003 | Berberich et al. |
| 2004/0130622 A1* | 7/2004 | Lang et al. .................... 348/148 |
| 2009/0231430 A1* | 9/2009 | Buschmann et al. ......... 348/148 |
| 2009/0309971 A1* | 12/2009 | Schuetz ........................ 348/148 |
| 2010/0260495 A1 | 10/2010 | Usami et al. .................. 396/419 |
| 2012/0293656 A1* | 11/2012 | Schutz .......................... 348/148 |

FOREIGN PATENT DOCUMENTS

| | | |
|---|---|---|
| DE | 102006023103 A1 | 11/2007 |
| DE | 102006039192 A1 | 2/2008 |
| DE | 102006048373 A1 | 4/2008 |
| DE | 102008010966 A1 | 8/2009 |
| EP | 1529688 A1 | 5/2005 |
| JP | 11334471 A | 12/1999 |

OTHER PUBLICATIONS

Chinese Office Action issued May 5, 2014 re: Chinese Application No. 201180006044.X; citing: US 2003/0146831A1 and CN 101506456A.

* cited by examiner

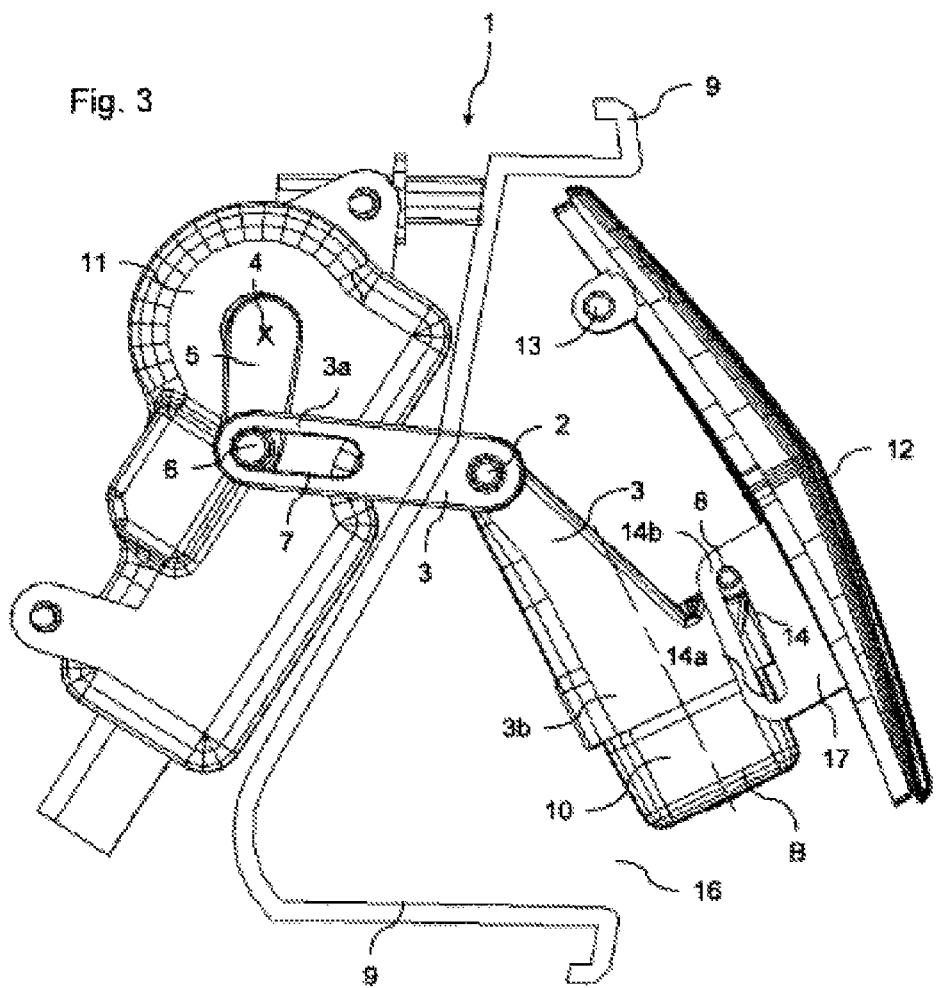

DEVICE FOR A MOTOR VEHICLE COMPRISING A MOVABLY MOUNTED CAMERA UNIT AND MOTOR VEHICLE

TECHNICAL FIELD

The invention relates to a device for a motor vehicle, having a movably mounted camera unit which can be brought into a standby position and into an active position via a drive unit, and having a protective element which can be guided into a closed position and an open position, wherein the camera unit is in its standby position and is not accessible from outside behind the protective element when the same is in the closed position, and the camera unit is in the active position to capture an image when the protective element is in the open position. The invention also relates to a motor vehicle having a rotatably mounted camera unit.

BRIEF SUMMARY OF RELATED ART

The use of cameras and/or of a camera unit for the purpose of detecting the environment of a vehicle is known. Such camera units are used, for example, as parking and/or maneuvering aids, particularly to image the areas around the automobile which cannot be seen with the conventional mirrors of the motor vehicle.

EP 1 529 688 A1 discloses a camera arrangement for motor vehicles, having a camera unit for capturing images, wherein the camera unit is arranged behind a pivotable protective element, substantially inaccessible from the outside, when in a non-active position. In the case of this device, the camera unit is indirectly attached to the protective element. The indirect arrangement of the camera on the protective element has proven to be disadvantageously prone to failure. Due to the effects of weather and to the appearance of wear, after a certain period of time the protective element no longer provides an acceptable seal, such that the camera unit attached on the protective element is exposed to a certain degree of dirt and moisture. The lenses of the video camera in particular must therefore be cleaned frequently. In addition, the camera can be easily damaged by impacts or percussion to the protective element due to its direct arrangement on the protective element.

A different device for a motor vehicle having a movably mounted camera unit is known from DE 10 2006 048 373 A1. The camera unit can be brought into a standby position and into an active position via a motor. In addition, a rotatably mounted protective element can be moved into a closed position and into an open position. A disadvantage of this device is that the motor has a first mechanism for the purpose of moving the camera unit, and a second mechanism for the purpose of moving the protective element. This makes the device complicated from a structural engineering perspective, meaning that the device requires a relatively high number of components, and the manufacture of the device is therefore also cost-intensive.

The problem addressed by the present invention is therefore that of creating a simple and cost-effective device for a motor vehicle, having a movably mounted camera unit, which avoids the disadvantages named above. The device should particularly have few components and enable the effective protection of the camera unit.

In addition, a vehicle having a simple and cost-effective device, the same having a movably mounted camera unit, should be created.

BRIEF SUMMARY

These problems are addressed according to the invention by a device for a motor vehicle having a movably mounted camera unit, as well as by a motor vehicle having a movably mounted camera unit. Additional features and details of the invention are found in the dependent claims, in the description, and in the figures. Features and details which are described in the context of the device according to the invention also hereby apply in the context of the motor vehicle according to the invention, and vice-versa, such that any disclosure pertaining to one of the individual aspects of the invention shall also refer to the other.

According to the first aspect of the invention, the problem is solved by a device for a motor vehicle having a movably mounted camera unit which can be brought into a standby position and into an active position via a drive unit, and having a protective element which can be guided into a closed position and into an open position, wherein the camera unit is in its standby position and is not accessible from outside behind the protective element when the same is in the closed position, and the camera unit is in the active position to capture an image when the protective element is in the open position, and wherein the camera unit is arranged on a movably mounted pivot arm which connects the drive unit with the protective element, wherein the protective element can be guided into the closed position and into the open position, and the camera unit can be guided into the standby position and into the active position by a movement of the pivot arm initiated by the drive unit.

Such a device for a motor vehicle, having a movably mounted camera unit, is designed in a simple and cost-effective manner, and ensures secure protection of the camera unit from external influences, particularly impacts or percussion, particularly when the protective element is in the closed position.

The device according to the invention is arranged on a motor vehicle, particularly on the rear end of a motor vehicle. The device can be arranged in the frame of the vehicle, in a panel element such as a bumper, or in the trunk hatch of the motor vehicle, for example. The device according to the invention is preferably included in a passenger vehicle or tractor trailer. Provision of the device in other motor vehicles, such as construction vehicles like excavators, cranes, caterpillars, etc., for example, can also be contemplated.

In the device according to the invention, the camera unit is arranged on the vehicle, and is in its standby position in a protected location behind the protective element, the same accordingly being in its closed position. During the movement of the protective element into its open position as a result of a movement of the pivot arm, the camera unit is simultaneously transferred from its standby position into the active position. In the active position, the camera unit can be used for the purpose of image capture. Because both the protective element and the camera unit are moved in a defined manner by one and the same pivot arm, they cannot collide with each other during a movement.

The device is designed in such a manner that the protective element can be moved, both from the closed position into the open position and from the open position into the closed position, and the camera unit can be moved, both from the standby position into the active position and from the active position into the standby position, by means of a movement of the pivot arm initiated by the drive unit.

The camera unit is arranged on a movably mounted pivot arm which connects the drive unit to the protective element. Both the protective element and the camera unit are moved by means of a movement of the pivot arm initiated by the drive unit. The device is designed with a simple construction as a result of the combined movement of the protective element and the camera unit. The drive unit only moves a single pivot arm in order to guide the protective element from the closed position into the open position while simultaneously guiding the camera from the standby position into the active position. Because the camera unit is arranged on the pivot arm and not on the protective element, the camera unit is protected from external influences such as impacts or percussion.

Because the camera is arranged on the pivot arm which is functionally connected to the drive unit, which can consequently be moved by the drive unit, and at the same time the protective element is arranged on the pivot arm, the protective element and the camera unit can be moved at the same time by means of a movement of the pivot arm.

The pivot arm can only be moved by means of the drive unit, such that the former cannot be operated manually. In this way, the protective element connected to the pivot arm and the camera unit arranged on the pivot arm are held securely in every location. This means that if the pivot arm is not moved by means of the drive unit, the protective element and the camera unit remain in a stable location and/or in a fixed position, meaning either in the closed position or in the open position, and in the standby position or in the active position.

The protective element can be either movably mounted or arranged rigidly on the pivot arm. If the protective element is rigidly connected to the pivot arm, for example, the protective element moves translationally when the pivot arm moves. In the case of a movable mounting of the protective element on the pivot arm, the protective element can be rotated and/or pivoted about an axis when the pivot arm moves, for example.

According to a preferred implementation of the invention, the device can be configured such that the protective element is arranged to be able to rotate and/or pivot about a first axis, and such that the pivot arm with the camera unit can rotate about a second axis. In this embodiment of the device, the protective element is not only connected to the pivot arm, but rather is additionally arranged to be able to rotate and/or pivot on a first axis. In this way, the protective element, which can also be termed a protective cap, is held particularly securely on the device and/or on a vehicle. The first axis is particularly designed as a fixed axis. The pivot arm on which the camera unit sits is rotatably mounted about a second axis, and preferably likewise a fixed axis. In this way, the pivot arm can be rotated about the second axis by means of the drive unit. This means that the camera unit can be moved back and forth between a standby position and an active position, and/or the protective element can be moved back and forth between a closed position and an open position, by means of a rotary movement of the pivot arm.

The device is advantageously designed in such a manner that the pivot arm has a functional connection to the protective element, such that when the protective element is in the closed and/or open position, a movement of the protective element is not possible by means of the application of a force applied manually from the outside onto the protective element. This means that, in both the closed position and the open position, the protective element cannot move. The open position and the closed position of the protective element constitute defined, stable positions which are prespecified by the pivot arm and by the connection of the protective element to the pivot arm. The manner of the connection of the protective element to the pivot arm advantageously limits both the open position and the closed position of the protective element.

The drive unit of the device can have an actuator, for example, via which the pivot arm can be moved. The pivot arm can be moved back and forth by means of a lifting movement, and particularly a linear lifting movement, of the actuator, for example, such that the same can rotate about the second axis. In addition, the drive unit can have a motor, and particularly an electric motor, and/or can be designed as an electric motor. One advantage of a drive unit designed in this way is that the motor has a self-locking function such that a manual movement of the protective element connected to the motor via the pivot arm is not possible. This means that, in the event that the protective element is pulled, for example, the motor designed to self-lock prevents the movement of the protective element and therefore of the camera unit. As such, a motor designed to self-lock constitutes an effective protection against theft.

In one preferred embodiment of the device, the drive unit has a crank arm rotatably mounted about a third axis, a guide element is arranged on the crank arm and said guide element runs parallel to the third axis and can be guided in a circular path about the third axis when the crank arm makes a rotary movement, and the guide element is functionally connected to the pivot arm for the purpose of moving the pivot arm. With such an embodiment of the device, the pivot arm can be moved securely and uniformly. The drive unit can rotate the crank arm either clockwise or counter-clockwise. A guide element is included on the crank arm and is arranged on the crank arm at a distance from the rotary axis of the third axis, such that the guide element can be moved in a circular path about the rotary axis of the third axis when the crank arm makes a rotary movement. The guide element is functionally connected to the pivot arm for the purpose of moving the pivot arm. This means that the pivot arm can be rotated about the second axis when the guide element makes a circular and/or at least semi-circular movement.

According to a further preferred embodiment of the invention, in one configuration of the device the end of the pivot arm closest to the drive unit has a guide slot for the movement of the pivot arm by means of the drive unit, particularly for guiding the guide element of the crank arm. As a result of such a design of the pivot arm, the guide element on the crank arm of the drive unit can rotate by means of engagement into the guide slot of the pivot arm, [and] the same can move and/or can rotate about the second axis upon the rotation of the crank arm. The guide slot is preferably an opening, particularly in the form of a slot in the end of the pivot arm which faces toward the drive unit. In this case, the length of the guide slot is adapted to the rotary movement of the crank arm and/or of the guide element. The guide element of the crank arm is mounted in a positive-fitting and/or nearly positive-fitting manner in the guide slot of the pivot arm, in a manner allowing the guiding and/or sliding thereof. The guide element of the crank arm is preferably designed as a cam or as a slide block.

The protective element is preferably likewise arranged movably on the pivot arm. A device is particularly preferred wherein the end of the pivot arm which is closest to the protective element has a guide element which is held in a guide slot of the protective element and which can be guided. This means that upon a movement, and particularly a rotary movement, of the pivot arm, the guide element arranged on the pivot arm glides in and along the guide slot of the protective element, and the protective element is moved, and particularly rotated. The guide element of the pivot arm is preferably designed as an element which projects from the pivot arm, particularly as a cam or a slide block. In this case, the longitudinal axis of the guide element of the pivot arm preferably runs parallel to the second and the first axes of the device.

The device is particularly designed in such a manner that when the protective element is in the closed position, the guide element of the pivot arm abuts the end of the guide slot of the protective element farthest from the first axis, and that when the protective element is in the open position, the guide element of the pivot arm abuts the end of the guide slot of the protective element which is closest to the first axis. In this way, the position of the closed position of the protective element and the position of the open position of the protective element are prespecified in a defined manner. As such, the ends of the guide slot each form a limit stop for the guide element of the pivot arm, and thereby limit both the movement of the pivot arm, and particularly the rotation thereof, and also the movement of the protective element.

According to a further preferred embodiment of the invention, in one configuration of the device the guide slot of the pivot arm can be designed with a straight profile and/or a curved profile, and/or the guide slot of the protective element can be designed with a straight profile and/or a curved profile. The guide slot of the pivot arm and the guide slot of the protective element are preferably designed with a straight profile if the pivot arm is rotatably mounted about an axis, meaning the second axis. Furthermore, it is preferred that the guide slot of the protective element is designed with a straight profile and the longitudinal axis of the guide slot of the protective element is oriented toward or nearly toward the first axis. In this way it is ensured that the guide element of the pivot arm glides optimally in the guide slot of the protective element, and there are no hang-ups in the movement of the pivot arm and of the protective element.

The guide element of the pivot arm is arranged on the end of the pivot arm closest to the protective element. Because the camera unit is preferably arranged on the end face of this end of the pivot arm, the guide element is preferably disposed on the side of this end of the pivot arm. The camera unit is particularly arranged on the end of the pivot arm closest to the protective element, via a force-fit connection. The camera unit therefore advantageously forms the termination of the end of the pivot arm closest to the protective element, on the end face thereof.

According to a further preferred implementation of the invention, in one configuration of the device the guide element of the crank arm can be rotatably arranged on the crank arm, and/or the guide element can be rotatably arranged on the end of the pivot arm closest to the protective element. In this way, it is ensured that the guide element of the pivot arm and the guide element of the crank arm can glide along in the corresponding guide slot in a particularly secure manner.

The pivot arm of the device can be designed in various different ways. The pivot arm is preferably designed with an angled profile. In this case, the pivot arm can be designed as a single piece or as having multiple pieces, particularly two pieces. In the case of a multi-part construction of the pivot arm, the different parts of the pivot arm are rigidly connected to each other during operation of the device. In the case of a two- or multi-part design of the pivot arm, it is advantageous that individual parts can be exchanged in a simpler and more cost-effective manner than in the case of a pivot arm designed as a single piece. The pivot arm and/or the individual parts of the pivot arm are preferably constructed of plastic or metal, and particularly of light metal. A pivot arm designed as a single piece has a hole, particularly in the center and/or in the region of the center of the pivot arm, through which the pivot arm is rotatably mounted on the second axis of the device. If the pivot arm is designed as two pieces, for example, the two parts and/or two limbs of the pivot arm each have a hole which serves the purpose of mounting the two parts on the second axis.

The protective element of the device is preferably designed as an emblem, and/or the protective element of the device preferably has an emblem. An emblem in the context of the invention is particularly an identifier for a motor vehicle brand, particularly an automobile brand. In this case, the emblem can be designed as two- or three-dimensional.

The first and the second axis of the device are preferably arranged as non-moving. In this case, the axes can be arranged on the motor vehicle, particularly on a vehicle chassis component, on a bumper, or on the trunk hatch of the motor vehicle. According to a further implementation of the invention, in one configuration of the device the first axis and the second axis can be arranged on a housing element of the device. The housing element of the device is preferably designed in such a manner that it can be arranged on a motor vehicle, particularly on a vehicle chassis component, on a bumper, or on a trunk hatch of a motor vehicle. In this case, the housing element forms a protective space, at least for a part of the device, which has an opening which can be covered by the protective element. This means that when the closing element is in the closed position, the same completely covers the opening, such that the device, particularly the pivot arm, the camera unit, and the drive unit are protected. The drive unit can be arranged outside of the housing element, inside the motor vehicle. In this case, the housing element has an opening, particularly a guide slot, through which the pivot arm of the device can pass.

It is preferred that the protective element covers the opening of the housing element of the device when the protective element is in its closed position, and that the camera unit passes through the opening of the housing element of the device when in the active position.

According to a second aspect of the invention, the problem is addressed by a motor vehicle having a movably mounted camera unit, wherein the motor vehicle has at least one device according to the first aspect of the invention. The motor vehicle is preferably designed as a tractor-trailer or a passenger vehicle. The motor vehicle can also be a boat or a ship. It can likewise be contemplated that the motor vehicle is designed as a construction vehicle, such as an excavator, a caterpillar, a crane, etc., for example. It is particularly advantageous if the motor vehicle has two or more such devices. In that case, multiple devices can be coupled to each other in such a manner that they can be operated in parallel. One drive unit can particularly move multiple pivot arms having camera units arranged accordingly.

BRIEF DESCRIPTION OF THE DRAWINGS

Additional advantages, features, and details of the invention are found in the following description, wherein one embodiment of the invention is described in detail with reference to the figures. The features mentioned in the claims and in the description can be essential to the invention individually or in any combination thereof.

FIG. 3: shows a side view of the device according to FIG. 1, wherein the camera unit is in the active position and the protective element is in the open position.

DETAILED DESCRIPTION

Figure 1:
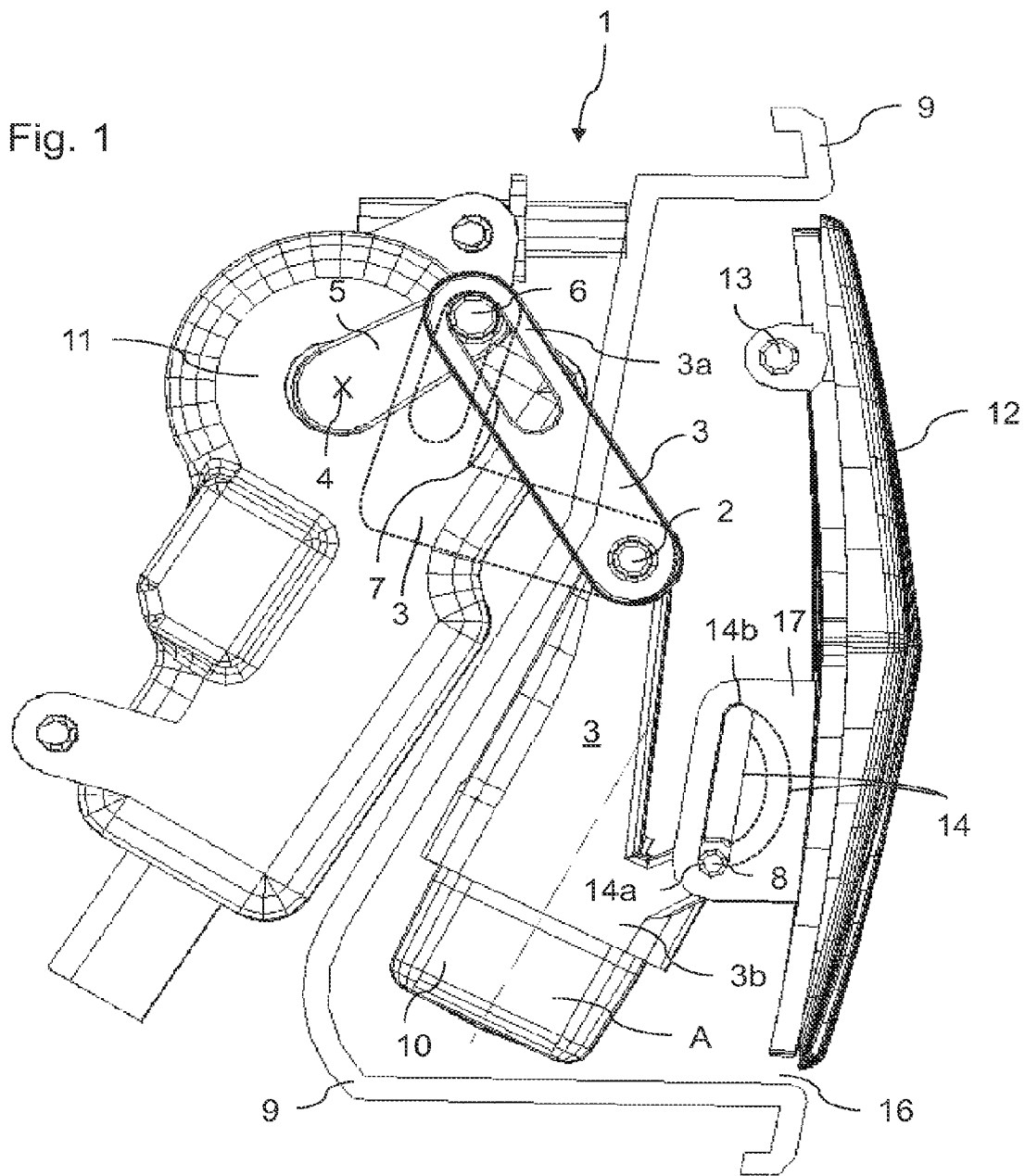
FIG. 1: shows a side view of the device for a motor vehicle, having a movably mounted camera unit which is designed according to the constructive principle of the invention, wherein the camera unit is in the standby position and the protective element is in the closed position.
Figure 2:
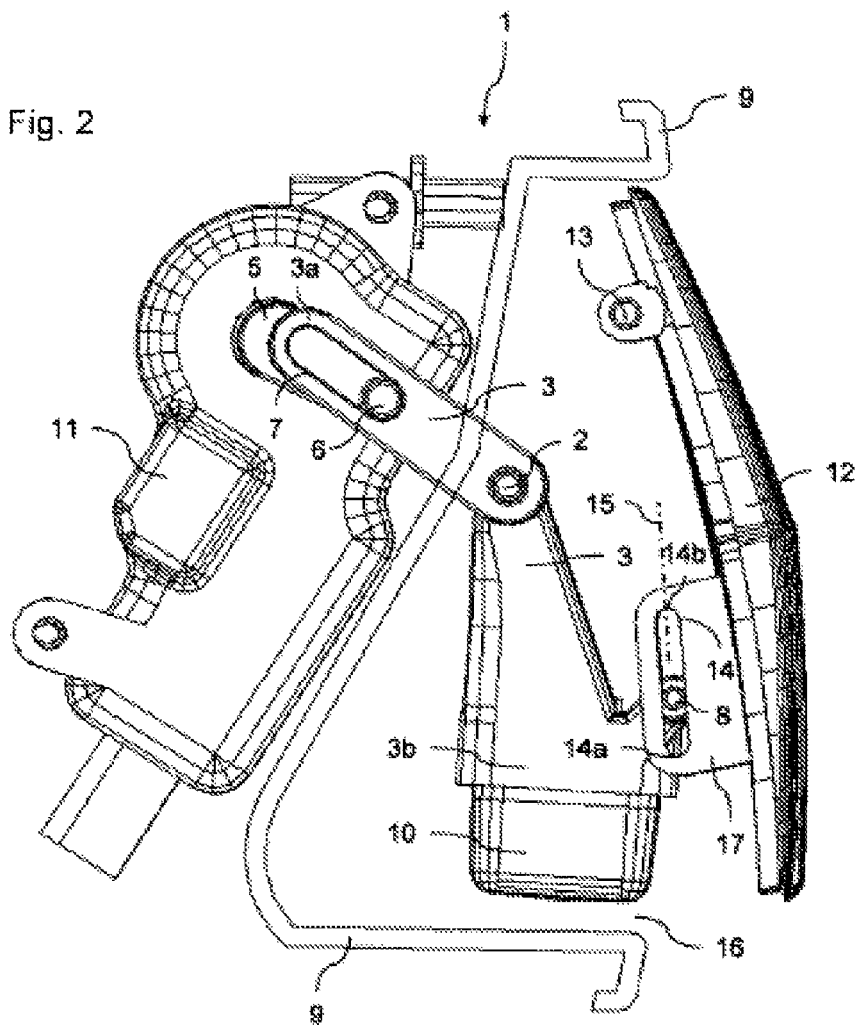
FIG. 2: shows a side view of the device in FIG. 1 during the movement of the camera unit and the protective element.

Elements which have the same function and mode of action are indicated by the same reference numbers in FIGS. 1 to 3.

FIG. 1 shows a side view of one embodiment variant of the device 1 for a motor vehicle, having a movably mounted camera unit 10 which is designed according to the constructive principle according to the invention, wherein the camera unit 10 is in the standby position A and the protective element 12 is in the closed position. The device 1 has a drive unit 11 which has a functional connection to a pivot arm 3 of the device 1. The pivot arm 3 connects the drive unit 11 to the protective element 12. In this embodiment variant of the device 1, the pivot arm 3 is designed having two parts, and both parts of the pivot arm 3 are rigidly connected to each other. The pivot arm 3 is designed with an angled profile and is rotatably mounted about a second axis 2 of the device 1. The end of the pivot arm 3 which is closest to the drive unit 11, the so-called first end 3a of the pivot arm 3, has a guide slot 7 in the form of a longitudinal opening, particularly in the form of a longitudinal slot. The drive unit 11 has a crank arm 5 which is rotatably mounted about a third axis 4. A guide element 6 is arranged on the free end of said crank arm 5. The guide element 6 of the crank arm 5 is particularly designed as a cam or slide block which projects from the crank arm 5. The crank arm 5 and/or the guide element 6 of the drive unit 11 in this case are connected to the pivot arm 3 in such a manner that the guide element 6 can glide in the guide slot 7 of the pivot arm 5 such that the pivot arm 3 can be rotated about the second axis 2 upon a movement of the crank arm 3 and therefore of the guide element 6. The camera unit 10 is arranged on the end of the pivot arm 3 closest to the protective element 12, meaning the so-called second end 3b of the pivot arm 3.

In this embodiment variant, the camera unit 10 is arranged on the end face of the second end 3b of the pivot arm 3. The pivot arm 3 has a guide element 8 on the side of the second end 3b of the pivot arm 3, said guide element 8 being particularly designed as a cam or a slide block. This guide element 8 of the pivot arm 3 has a functional connection to the protective element 12. This means that the guide element 8 is mounted in a guide slot 14 of the protective element 12 in a manner allowing the guide element 8 to be guided. Upon a movement of the pivot arm 3, the guide element 8 glides in the guide slot 14 of the protective element 12. The protective element 12 forms the termination of the device 1. This means that, when the protective element 12 is in the closed position illustrated in FIG. 1, the protective element 12 entirely covers the remaining parts of the device 1, such that these parts are securely protected from external influences such as impacts or percussion. The device 1 advantageously has a housing element 9 in which at least parts of the device 1 are arranged. In this way, these parts, and particularly the pivot arm 3 and the camera unit 10, are arranged in a protected manner. In order that the camera unit 10 can be moved into an active position, the housing element 9 has an opening 16. In the closed position, the protective element 12 entirely covers the opening 16, such that the camera unit 10 and the remaining components of the device 1 are protected. In this embodiment variant, the drive unit 11 advantageously has a motor. As an alternative, the drive unit 11 can have an actuator via which the pivot arm 3 can be rotated about the second axis 2.

When the protective element 12 is in the closed position, the guide element 8 of the pivot arm 3 abuts the end 14a of the guide slot 14 of the protective element 12 which is farthest from the first axis 13. In this way, the closed position of the protective element 12 is prespecified in a defined manner. A further movement, and particularly a further rotation, of the protective element 12 is prevented by the limit stop of the guide element 8 of the pivot arm 3 on the end 14a of the guide slot 14 farthest from the first axis 13. The protective element 12 is rotatably mounted about the first axis 13. The guide slot 14 of the protective element 12 is preferably disposed on a projection 17 of the protective element 12. This projection 17 projects toward the pivot arm 3 of the device 1.

The same embodiment variant of the device as in FIG. 1 is illustrated in FIG. 2, wherein the camera unit 10 is in a position between the standby position A as illustrated in FIG. 1 and the active position B as illustrated in FIG. 3. The same applies to the protective element 12. In FIG. 2, the latter is between the closed position as illustrated in FIG. 1 and the open position as illustrated in FIG. 3. The guide element 6 of the crank arm 5 of the drive unit 11 has slid along the guide slot 7 of the pivot arm 3 toward the second axis 2. The pivot arm 3 is rotated about the second axis 2 by the movement of the guide element 6 of the crank arm 5, such that the guide element 8 of the pivot arm 3 moves the protective element 12, particularly about the first axis 13. In this case, the guide element 8 of the pivot arm 3, the former particularly being designed as a cam or a slide block, glides in the guide slot 14 of the protective element 12, thereby moving the same. The longitudinal axis 15 of the guide slot 14 of the protective element 12 in this case is particularly designed in such a manner that it is oriented toward the first axis 13. With such a construction of the protective element 12 and/or of the pivot arm 3 of the device 1, it is ensured that the guide element 6 of the crank arm 5, and the guide element 8 of the pivot arm 3, can glide optimally in and along the corresponding guide slots 7 and/or 14.

FIG. 3 shows a further side view of the device according to FIG. 1, wherein the camera unit 10 is in the active position B and the protective element 12 is in the open position. The camera unit 10 is pivoted to such a degree that it is guided through and out of the opening 16, meaning that it is guided into an active position B. In this active position B, the camera unit 10 can be used for image capture. The guide element 8 of the pivot arm 3 has glided along the guide slot 14 of the protective element 12 to such a degree that further movement of the protective element 12 has been restricted by the limit stop of the guide element 8 on the end 14b of the guide slot 14 which is closest to the first axis 13. This means that the guide slot 14, and particularly the end 14b of the guide slot 14 which serves as the limit stop, limits a further rotation of the protective element 12 about the first axis 13. The special construction and arrangement of the guide slot 14 of the protective element 12, and the rotation of the pivot axis 13 about the second axis 2, cause the protective element 12 to assume a secure and stable position in the open position. In this position of the device 1, the guide element 6 of the crank arm 5 abuts the end of the guide slot 7 of the pivot arm 3 which is farthest from the second axis 2. When the protective element 12 is in the open position, wherein the camera unit 10 is in the active position, the crank arm 5 of the drive unit 11 remains in its place. If the crank arm 5 of the drive unit 11 is rotated back counter-clockwise, the pivot arm 3 rotates clockwise, such that as a result the protective element 12 can be guided back from the open position into a closed position as illustrated in FIG. 1, and simultaneously the camera unit 10 can be guided back from the active position B into the standby position A, as likewise illustrated in FIG. 1.

It is advantageous in such a device for a motor vehicle having a movably mounted camera unit that the same requires fewer constructive components compared to the known devices of this type. As such, the camera unit can be extended at the same time as the protective element is opened, and/or can be retracted when the protective element is closed, as a result of the special arrangement of the pivot arm, the same connecting the drive unit and the protective element to each other, and the special arrangement of the camera unit on the pivot arm. Only one single pivot arm is included for the purpose of moving the camera unit and the protective element, and this pivot arm is moved by means of a drive unit. The special construction and/or arrangement of the guide element of the pivot arm and of the guide slot of the protective element provide an arrangement of the device, and particularly the camera unit, which protects the same from theft. In both the retracted position of the camera unit, an in the extended position of the camera unit, a stable position of the camera unit and/or of the protective element is provided. In the retracted position of the camera unit, meaning the standby position of the camera unit, the closed protective element cannot be manually moved from the outside, thereby ensuring an effective protection against theft for the camera.

The invention claimed is:

1. Device for a power-driven vehicle having a movably supported camera unit which can be brought into a resting position and into an active position by means of a drive unit and a protective element, which can be guided into a closed position and into an open position, wherein in the closed position of the protective element the camera unit is in its resting position behind the protective element inaccessible from the outside, and in the open position of the protective element the camera unit is in the active position for capturing images,
wherein the camera unit is arranged on a moveably supported swivel arm which connects the drive unit with the protective element, wherein the protective element can be brought into the closed position and into the open position as well as the camera unit into the resting position and into the active position by means of a movement of the swivel arm induced by the drive unit, wherein the end of the swivel arm facing the protective element comprises a guide element which is guidably supported in a sliding block guide of the protective element.

2. Device according to claim 1, wherein the protective element is arranged rotatable around a first axis and that the swivel arm with the camera unit is supported rotatable around a second axis.

3. Device according to claim 1, wherein the protective element is arranged pivotable around a first axis and that the swivel arm with the camera unit is supported rotatable around a second axis.

4. Device according to claim 1, wherein the swivel arm operatively interacts with the protective element in such a way that a movement of the protective element caused by the interaction of a force applied manually from the outside onto the protective element is prevented in the closed and open position of the protective element.

5. Device according to claim 1, wherein the drive unit comprises a crank supported rotatable around a third axis, that a guide element is arranged on the crank,
said guide element running parallel to the third axis and which can be guided in a circular motion around the third axis with a rotary motion of the crank, and that the guide element operatively interacts with the swivel arm to move the swivel arm.

6. Device according to claim 5, wherein the guide element of the crank and/or the guide element of the second end of the swivel arm is a sliding block or a cam.

7. Device according to claim 5, wherein the sliding block guide of the protective element is straight and/or curved.

8. Device according to claim 5, wherein the guide element of the crank is arranged rotatable on the crank.

9. Device according to claim 5, wherein the guide element is arranged rotatable on the swivel arm on the end of the swivel arm facing the protective element.

10. Device according to claim 1, wherein the end of the swivel arm facing the drive unit comprises a sliding block guide for moving the swivel arm by means of the drive unit.

11. Device according to claim 1, wherein the end of the swivel arm facing the drive unit comprises a sliding block guide for guiding the guide element of the crank.

12. Device according to claim 1, wherein in the closed position of the protective element the guide element of the swivel arm strikes the end of the sliding block guide of the protective element facing away from the first axis and that in the open position of the protective element the guide element of the swivel arm strikes the end of the sliding block guide of the protective element facing the first axis.

13. Device according to claim 1, wherein the sliding block guide of the protective element is designed straight and the longitudinal axis of the sliding block guide of the protective element is fully or almost fully directed at the first axis.

14. Device according to claim 1, wherein the guide element of the swivel arm is arranged at the side on the second end of the swivel arm.

15. Device according to claim 1, wherein the camera unit is arranged on the end of the swivel arm facing the protective element.

16. Device according to claim 1, wherein the swivel arm is angled.

17. Device according to claim 1, wherein the protective element comprises an emblem.

18. Power-driven vehicle having a movably supported camera unit, wherein the vehicle comprises at least one device according to claim 1.

* * * * *